United States Patent
Parrish

(10) Patent No.: US 7,123,810 B2
(45) Date of Patent: Oct. 17, 2006

(54) OPTICAL FIBER CONNECTORS WITH IDENTIFICATION CIRCUITS AND DISTRIBUTION TERMINALS THAT COMMUNICATE THEREWITH

(75) Inventor: Mark Parrish, Jacksonville, FL (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 245 days.

(21) Appl. No.: 10/838,829

(22) Filed: May 4, 2004

(65) Prior Publication Data
US 2005/0249477 A1 Nov. 10, 2005

(51) Int. Cl.
*G02B 6/00* (2006.01)

(52) U.S. Cl. .......................... 385/139; 385/14; 385/16; 385/17; 385/24; 385/88; 385/89; 385/92; 385/55; 385/134; 385/147

(58) Field of Classification Search ................ 385/139, 385/134, 147, 55, 14, 16, 17, 24, 88–89, 385/92
See application file for complete search history.

(56) References Cited

U.S. PATENT DOCUMENTS 6,898,368 B1 * 5/2005 Colombo et al. ........... 385/147

* cited by examiner

*Primary Examiner*—Frank G. Font
*Assistant Examiner*—Michael P. Mooney
(74) *Attorney, Agent, or Firm*—Myers Bigel Sibley & Sajovac, P.A.

(57) ABSTRACT

An optical fiber connector can include an optical fiber interface, an identification circuit, and an electrical interface that is communicatively connected to the identification circuit. The identification circuit may be a non-volatile memory such as, for example, a read only memory, a magnetic random access memory and/or a flash-random access memory. The identification circuit may include a housing that can be releasably connected to a Light Guide Cross Connect (LGX). The identification circuit may generate an electrical signal that identifies a fiber, a fiber bundle, a fiber type, a connector type, who manufactured an optical fiber, when an optical fiber was manufactured, and/or when an optical fiber was installed.

Related optical fiber distribution terminals are also discussed.

23 Claims, 1 Drawing Sheet

OPTICAL FIBER CONNECTORS WITH IDENTIFICATION CIRCUITS AND DISTRIBUTION TERMINALS THAT COMMUNICATE THEREWITH

FIELD OF THE INVENTION

The present invention generally relates to optical communications, and more particularly to optical fiber connectors and optical fiber distribution terminals.

BACKGROUND OF THE INVENTION

Communication systems are increasingly using optical fibers to provide high bandwidth communication services to regional areas and to subscriber equipment in homes and business. Light Guide Cross Connects (LGXs) are regionally distributed in the field to route, combine, and/or split signals between a plurality of connected optical fibers. A Trunk Information Record Keeping System (TIRKS) is used to track which optical fibers are being used for communications or are available for use, and to track which LGX the optical fibers are, or can be, connected. It the responsibility of field technicians who install and connect optical fibers and LGXs to generate reports that can be used by operators to update the records in TIRKS. If the records in TIRKS are inaccurate, in that they do not reflect the actual optical fiber and LGX connections in the field, mistakes may occur when optical fibers and/or LGX connections are inventoried and assigned for use.

SUMMARY OF THE INVENTION

In some embodiments of the present invention, an optical fiber connector includes an optical fiber interface, an identification circuit that is connected to the optical fiber interface, and an electrical interface that is communicatively connected to the identification circuit. In some further embodiments of the present invention, the identification circuit may be a non-volatile memory such as, for example, a read only memory, a magnetic random access memory and/or a flash-random access memory. The identification circuit may include a housing that can be releasably connected to a Light Guide Cross Connect (LGX). The identification circuit may generate an electrical signal that identifies a fiber, a fiber bundle, a fiber type, a connector type, who manufactured an optical fiber, when an optical fiber was manufactured, and/or when an optical fiber was installed.

In some other embodiments of the present invention, an optical fiber distribution terminal includes a plurality of terminal connectors and a controller. Each of the terminal connectors includes an electrical interface and an optical interface, and is releasably connectable to an optical fiber connector that includes an electrical interface and an optical interface. The terminal connector communicatively couples its electrical interface and optical interface to a respective electrical interface and optical interface of a connected optical fiber connector. The controller communicates through the electrical interface of at least one of the terminal connectors and an electrical interface of a connected optical fiber connector to obtain identification information from the connected optical fiber connector In some further embodiments of the invention, the controller reads identification information from a connected optical fiber connector that identifies a fiber, a fiber bundle, a fiber type, a connector type, who manufactured an optical fiber, when an optical fiber was manufactured, and/or when an optical fiber was installed. The controller may write identification information to the connected optical fiber connector. The plurality of terminal connectors may be an LGX. The controller may communicate the identification information from the connected optical fiber connector to a central repository of fiber record information, such as a Trunk Information Record Keeping System (TIRKS) through a network. The controller may read system identification information (e.g. terminal identification (TID) information transmitted by a system) through the optical interface of the terminal connector from an optical signal carried by the connected optical fiber connector. The controller may communicate the system identification information to the central repository of fiber record information.

Other systems, methods, and/or computer program products according to embodiments of the invention will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein the term "comprising" or "comprises" is open-ended, and includes one or more stated elements, steps and/or functions without precluding one or more unstated elements, steps and/or functions. As used herein the term "and/or" includes any and all combinations of one or more of the associated listed items.

Figure 1:
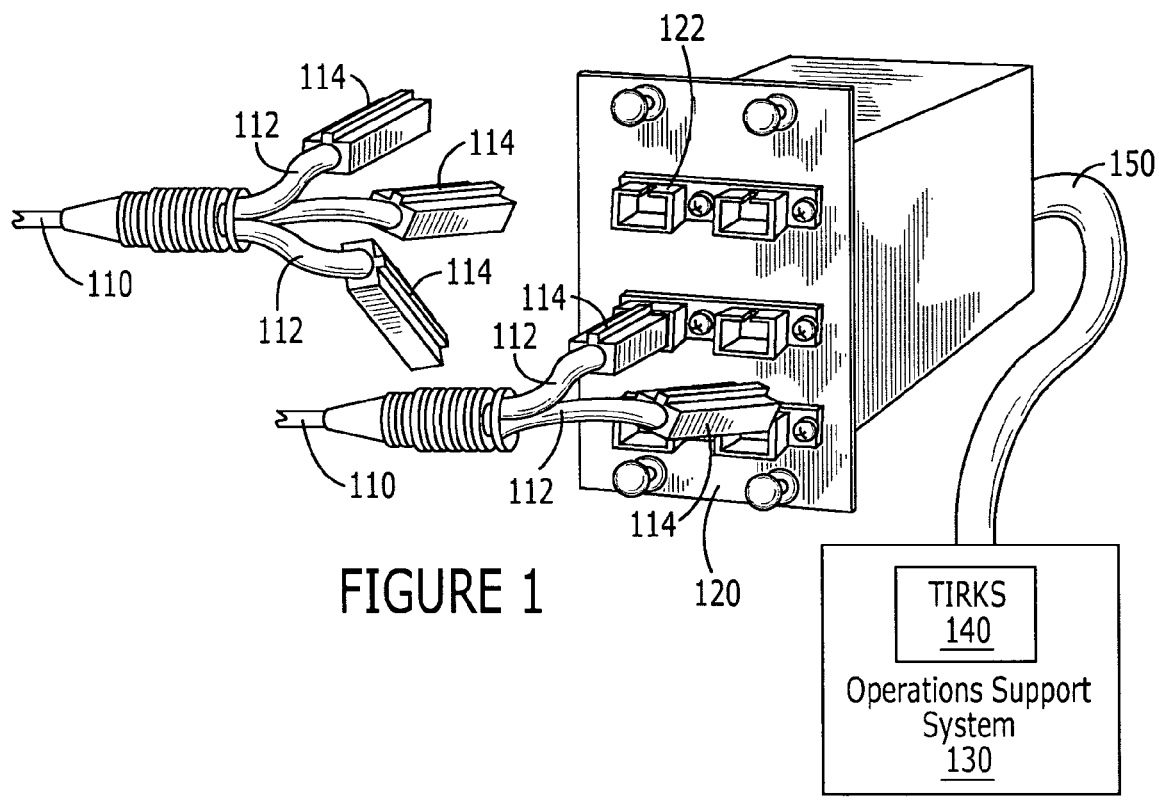
FIG. 1 is a diagram of optical fiber connectors, an optical fiber distribution terminal and an operations support system according to various embodiments of the present invention.

FIG. 1 illustrates a fiber optic communication system 100 that includes multi-fiber bundles 110, an optical fiber distribution terminal 120, and an operations support system 130. Each of the multi-fiber bundles 110 includes a plurality of optical fibers 112 with end fiber connectors 114. The fiber connectors 114 are configured to be releasably connected to terminal connectors 122 in the distribution terminal 120. When connected, an optical signal communication pathway is established through the optical fiber 112, the fiber connector 114 and an optical interface (e.g., optical fiber) in the terminal connector 122. The distribution terminal 120 may be a Light Guide Cross Connect (LGX), and may conduct an optical signal from a connected fiber 112 to one or more other connected fibers 112 (e.g., couple an optical signal from one fiber to another fiber and/or split an optical signal from one fiber to two or more fibers), and/or may combine optical signals from two or more connected fibers 112 to another connected fiber 112. It is to be understood that the number and configuration of the fiber bundles 110, the fibers 112, the fiber connectors 114, and the terminal connectors 122 in the distribution terminal 120 are provided for illustration purposes only, and that the invention is not restricted to the illustrated embodiment. Moreover, it is to be understood that the fiber optic communication system 100 may include numerous distribution terminal 120 that communicate via the network 150 with the operations support system 130.

As will be described further below, the distribution terminal 120 obtains fiber identification information from the fiber connectors 114 and/or determines system identification information from an optical signal carried by a connected fiber 112. The distribution terminal 120 then communicates the fiber identification information and/or the system identification information through a network 150, which may be a Central Office Wide Area Network (COWAN), to the operations support system 130. The operations support system 130 uses the received fiber identification information and/or system identification information to form a central repository of fiber record information. For example, the operations support system 130 can include a Trunk Information Record Keeping System (TIRKS) 140 that generates the central repository of fiber record information.

The operations support system 130, such as via the TIRKS 140, may associate fiber identifiers, fiber bundle identifiers, fiber types (e.g., single mode or multi-mode), connector types (e.g., E2000, SC, FC), fiber manufacturer, fiber manufactured date, fiber installation date, and/or system identification information with identifiers for the terminal connectors 122 in the distribution terminal 120. The operations support system 130 may then be used to track the status of fibers 112 in the fiber bundles 110 (e.g., spare, working, restricted, defective), the status of the terminal connectors 122 (e.g., spare, working, restricted, defective) in the distribution terminal 120, the type of systems (e.g., Synchronous Optical Network (SONET) or Asynchronous Transfer Mode (ATM)), and/or the identity of the systems (e.g., Terminal Identification (TID)) that are carried by the fibers 112 and the associated terminal connectors 122 of the distribution terminal 120.

Figure 2:
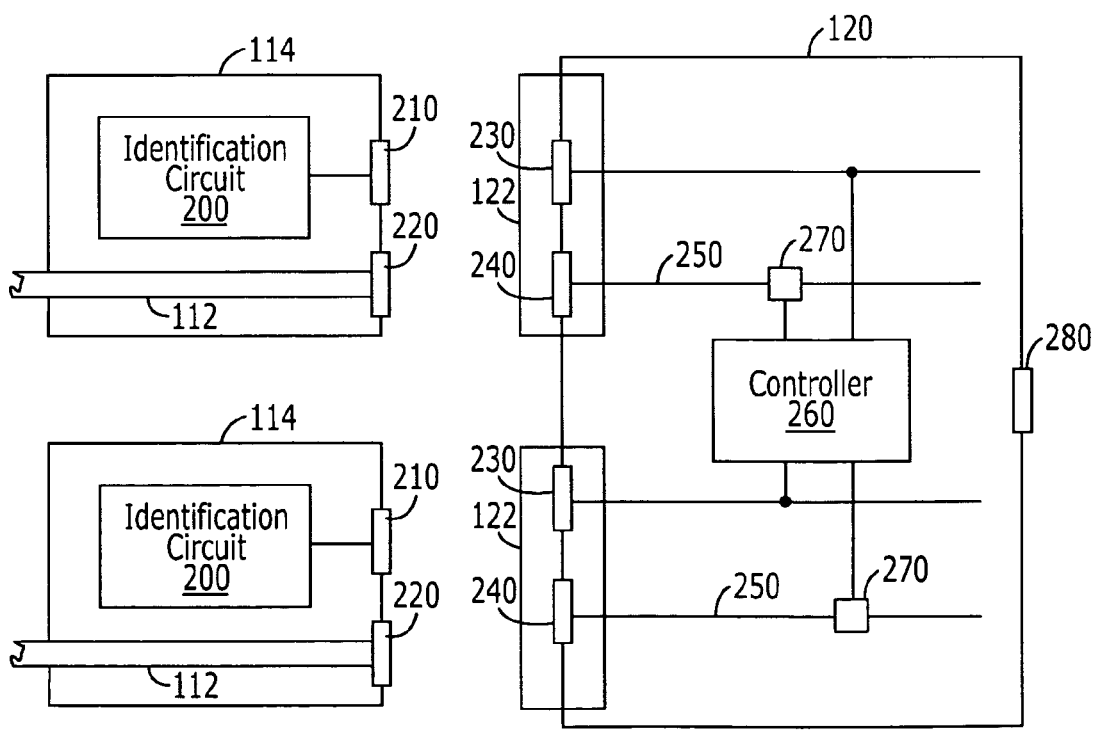
FIG. 2 is a block diagram of optical fiber connectors and an optical fiber distribution terminal according to various embodiments of the present invention.

FIG. 2 is a block diagram that illustrates further detail of two illustrated fiber connectors 114 and the distribution terminal 120 according to various embodiments of the present invention. The fiber connectors 114 include an identification circuit 200, an electrical interface 210, and an optical fiber interface 220. The identification circuit 200 may be a non-volatile memory such as a Read-Only Memory (ROM), flash Random Access Memory (RAM), and/or magnetic RAM. The optical interface 220 may be a polished end of one of the fibers 112 attached to the fiber connector 114. The identification circuit 200 generates an electrical signal that can identify the associated fiber 112/fiber connector 114, a fiber bundle associated with the fiber 112, the type of fiber (e.g., single mode or multi-mode), the type of fiber connector (e.g., E2000, SC, FC), the manufacturer of the fiber 112, and/or the manufacture date and/or the installation date of the fiber 112. The electrical interface 210 is electrically connected to the identification circuit 200 to conduct the electrical signal therefrom.

The terminal connectors 122 in the distribution terminal 120 include an electrical interface 230 and an optical interface 240 that communicatively connect to the respective electrical interface 210 and optical interface 220 of a connected fiber connector 114. The optical interface 240 may be a polished end of a fiber 250 and can carry an optical signal through the distribution terminal 120.

The distribution terminal 120 also includes a controller 260 that communicates with the identification circuit 114 via the electrical interfaces 210 and 230 and senses the optical signals carried by the fibers 112 and 250 via, for example, an optical-to-electrical converter 270. The controller 260 communicates with the identification circuit 200 to obtain information therefrom, including, for example, a fiber identifier, a fiber bundle identifier, a fiber type (e.g., single mode or multi-mode), a fiber connector type (e.g., E2000, SC, FC), fiber manufacturer, fiber manufactured date and/or fiber installation date. The controller 260 may read this information from a non-volatile memory in the identification circuit 200. The controller 260 may also store at least some of this information in the identification circuit 200 when the fiber connector 114 is connected to a terminal connector 122. For example, when a fiber connector 114 is connected to a terminal connector 122, the controller 260 may determine and write to the associated identification circuit 200 a fiber identifier that unique identifies the connected fiber 112, the fiber bundle 110 (FIG. 1) and/or the date of the connection.

The controller 260 may also determine the type of system (e.g., Synchronous Optical Network (SONET) or Asynchronous Transfer Mode (ATM)) and/or the identity of the system (e.g., from the Terminal Identification (TID) transmitted by a system) that is carried by the fiber 250 that is associated with the fiber connector 114.

The controller 260 communicates the information obtained from the identification circuit 200 and/or the determined system information to the operations support system 130 via a network interface 280, where it may be used to update the central repository of fiber record information, such as the TIRKS 140 (FIG. 1). The controller 260 may, for example, obtain and communicate the information responsive to a new connection of the fiber connector 114 and terminal connector 122, and/or responsive to a query from the operations support system 130.

Although the controller 260 is illustrated as connected to two terminal interfaces 230, it is to be understood that the controller 260 may be connected to one or more of the terminal interfaces 230, such that more than one controller 260 may be included in the distribution terminal 120. Moreover, it is to be understood that the distribution terminal 120 may include other components for routing, splitting, combining, and/or modifying the optical signals that are carried by the fibers 250.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. An optical fiber connector comprising:
    an optical fiber interface configured to conduct signals to an optical interface of an optical fiber distribution terminal;

an identification circuit including a non-volatile memory connected to the optical fiber interface; and an electrical interface that is connected to conduct signals between the identification circuit and an electrical interface of the optical fiber distribution terminal.

2. The optical fiber connector of claim 1, wherein the non-volatile memory comprises a read only memory.

3. The optical fiber connector of claim 1, wherein the non-volatile memory comprises a magnetic random access memory and/or a flash-random access memory.

4. The optical fiber connector of claim 1, further comprising a housing that is configured to be connected to a Light Guide Cross Connect (LGX).

5. The optical fiber connector of claim 1, wherein the identification circuit is configured to generate a fiber identifier electrical signal conducted through the electrical interface of the optical fiber connector.

6. The optical fiber connector of claim 1, wherein the identification circuit is configured to generate a fiber bundle identifier electrical signal conducted through the electrical interface of the optical fiber connector.

7. The optical fiber connector of claim 1, wherein the identification circuit is configured to generate a fiber type identifier electrical signal conducted through the electrical interface of the optical fiber connector.

8. The optical fiber connector of claim 1, wherein the identification circuit is configured to generate a connector type identifier electrical signal conducted through the electrical interface of the optical fiber connector.

9. The optical fiber connector of claim 1, wherein the identification circuit is configured to generate an electrical signal conducted through the electrical interface of the optical fiber connector that identifies at least one of who manufactured an optical fiber, when an optical fiber was manufactured, andlor when an optical fiber was installed.

10. An optical fiber distribution terminal comprising:

a plurality of terminal connectors, each of the terminal connectors comprising an electrical interface and an optical interface and configured to connect to an optical fiber connector having an electrical interface and an optical interface, and wherein each of the terminal connectors is configured to communicatively couple its electrical interface and optical interface to a respective electrical interface and optical interface of a connected optical fiber connector; and a controller that is configured to conduct signals through the electrical interface of at least one of the terminal connectors and an electrical interface of a connected optical fiber connector to read identification information from a non-volatile memory in the connected optical fiber connector.

11. The optical fiber distribution terminal of claim 10, wherein the controller is configured to read fiber identification information from the connected optical fiber connector.

12. The optical fiber distribution terminal of claim 10, wherein the controller is configured to read fiber bundle identification information from the connected optical fiber connector.

13. The optical fiber distribution terminal of claim 10, wherein the controller is configured to read fiber type identification information from the connected optical fiber connector.

14. The optical fiber distribution terminal of claim 10, wherein the controller is configured to read connector type identification information from the connected optical fiber connector.

15. The optical fiber distribution terminal of claim 10, wherein the controller is configured to read information from the connected optical fiber connector that identifies at least one of who manufactured an optical fiber, when an optical fiber was manufactured, and/or when an optical fiber was installed.

16. The optical fiber distribution terminal of claim 10, wherein the controller is configured to communicate through the electrical interface of the terminal connector and an electrical interface of the connected optical fiber connector to write information to the connected optical fiber connector.

17. The optical fiber distribution terminal of claim 10, wherein the optical fiber distribution terminal comprises a Light Guide Cross Connect (LGX).

18. The optical fiber distribution terminal of claim 10, wherein the controller is configured to communicate the identification information from the connected optical fiber connector to a central repository of fiber record information through a network.

19. The optical fiber distribution terminal of claim 18, wherein the controller is configured to communicate the identification information from the connected optical fiber connector to a Trunk Information Record Keeping System (TIRKS).

20. The optical fiber distribution terminal of claim 10, wherein the controller is configured to obtain system identification information from an optical signal carried by the connected optical fiber connector.

21. The optical fiber distribution terminal of claim 20, wherein the system identification information comprises terminal identification (TID) information transmitted by a system.

22. The optical fiber distribution terminal of claim 20, wherein the controller is configured to communicate the system identification information to a central repository of fiber record information through a network.

23. The optical fiber distribution terminal of claim 10, wherein the controller is configured to determine system identification information from an optical signal carried by the optical fiber and to communicate the system identification information and the identification information from the connected optical fiber connector through a network to a central repository of fiber record information.

* * * * *